US007742420B2

(12) United States Patent
Chapman et al.

(10) Patent No.: US 7,742,420 B2
(45) Date of Patent: Jun. 22, 2010

(54) METHOD AND APPARATUS FOR BANDWIDTH MANAGEMENT OF AGGREGATE DATA FLOWS

(75) Inventors: Alan Stanley John Chapman, Kanata (CA); Hsiang-Tsung Kung, Lexington, MA (US)

(73) Assignee: Ciena Corporation, Linthicum, MD (US)

( * ) Notice: Subject to any disclaimer, the term of this patent is extended or adjusted under 35 U.S.C. 154(b) by 1223 days.

(21) Appl. No.: 11/222,919

(22) Filed: Sep. 9, 2005

(65) Prior Publication Data

US 2006/0039285 A1 Feb. 23, 2006

Related U.S. Application Data

(63) Continuation of application No. 09/302,375, filed on Apr. 30, 1999, now abandoned.

(51) Int. Cl.
*H04L 12/28* (2006.01)
(52) U.S. Cl. ........................ 370/236; 370/252; 370/392; 370/401; 714/748
(58) Field of Classification Search ........................ None
See application file for complete search history.

(56) References Cited

U.S. PATENT DOCUMENTS 6,252,851 B1 * 6/2001 Siu et al. .................... 370/236

6,466,985 B1 * 10/2002 Goyal et al. ................. 370/236
6,473,425 B1 * 10/2002 Bellaton et al. ............. 370/392

OTHER PUBLICATIONS

Chang K: "IP Layer Per-flow Queueing and Credit Flow Control" PH.D. Dissertation Jan. 1998, pp. 18-28, XP002146481.
Yang C-Q; Reddy Avs: "A Taxonomy for Congestion Control Algorithms in Packet Switching Networks" IEEE Network, vol. 9, No. 4, Jul. 1, 1995, pp. 34-45, XP000525690, New York.

* cited by examiner

*Primary Examiner*—Steven H Nguyen
(74) *Attorney, Agent, or Firm*—Christopher & Weisberg, P.A.

(57) ABSTRACT

The present invention relates to a transmission device implementing a flow control mechanism for aggregate trunks. The transmission device can be implemented as a router that includes an input for receiving aggregate traffic streams, an output for releasing the aggregate traffic streams to a destination point and a control unit capable to regulate the rate of release of packets from the output. Specifically, the flow control operation effected by the control unit is dependent on receipt of acknowledgement messages issued at the destination point, each acknowledgement message confirming the receipt of one or more particular packets at the destination point. The control unit will continuously increase the packet sending rate until a packet is lost in the network between the transmission device and the destination point. On detection of packet loss, based on the lack of one or more corresponding acknowledgement messages from the destination point, the control unit will reduce the packet sending rate.

20 Claims, 4 Drawing Sheets

METHOD AND APPARATUS FOR BANDWIDTH MANAGEMENT OF AGGREGATE DATA FLOWS

This application is a Continuation of application Ser. No. 09/302,375, filed Apr. 30, 1999 now abandoned.

FIELD OF THE INVENTION

The present invention relates to the field of digital data transmission. More specifically, it pertains to a method and apparatus for performing traffic management functions, such as bandwidth management of aggregate traffic streams between two points of a data transport network.

BACKGROUND OF THE INVENTION

A typical data transport network operates in a connectionless mode whereby there is no negotiation between the transmitter/receiver and the network with regard to the type or quantity of traffic that is to be sent. The transmitter simply sends the traffic on the network, and relies on the network components to deliver that traffic to the receiver accurately. These network components consist typically of routing nodes (also known as routers or switches) joined by physical links. The main function of the routing nodes is to direct incoming packets to the appropriate outgoing links.

Many communication network applications have adopted the Internet Protocol (IP), a library of routines called on by various network communications applications for transporting packets of data from node to node. The Transmission Control Protocol (TCP) is used for most IP network transactions and provides for both reliable transmission and rate adaptation in order to adjust to available network bandwidth. TCP allows adaptive use of available bandwidth and accommodation of different rates at different points in the internetwork or network.

Within the IP networks, there is a growing interest in managing data traffic in the form of aggregate flows. A flow, also referred to as a connection, is a stream of traffic under control of one sender within the network. Specifically, aggregating individual traffic flows into one larger flow simplifies the management of the network; routes can be pinned down for the aggregates more simply than if all flows were visible. Treatments such as bandwidth allocation or forwarding priority can be assigned to the aggregate rather than having to manage it on a per-flow basis. In the future, it may be desirable to provide flow control for these aggregates, similar to TCP, so that they can compete for available bandwidth in a controlled manner.

In Internet terminology, aggregating data traffic by encapsulating them into a single IP packet stream is often called tunneling, where the encapsulated traffic flow through the IP network is referred to as an aggregate trunk or tunnel. When the number of aggregate trunks becomes very large, it may be desirable to add another level of aggregation by putting several such trunks into a new, larger trunk between chosen points in the network. One way to do this is to encapsulate the packets again with another TCP/IP header. Unfortunately, adding more headers to data packets is inefficient in bandwidth use and may be problematical if the longer packets violate Maximum Transport Unit (MTU) limits. Multi-protocol Label Switching (MPLS), another form of aggregation currently under development, minimizes the overhead by using a very small label instead of a full TCP/IP header. Unfortunately, the small header envisaged for MPLS does not provide room for the information usually carried in a TCP/IP flow controlled connection.

The background information herein clearly shows that there exists a need in the industry to provide an improved mechanism for ensuring flow control of an aggregate stream between two points in a network.

SUMMARY OF THE INVENTION

The present invention is directed to a transmission device for controlling the flow of an aggregate traffic stream between two points in a network, specifically a forwarding point and a destination point. The transmission device at the forwarding point includes an input for receiving aggregate traffic streams, an output for forwarding aggregate traffic streams to the destination point and a control unit for regulating the rate of release of data packets being forwarded by the transmission device to the destination point in dependence of acknowledgement messages received from the destination point. The acknowledgement messages are sent from the destination point to the forwarding point to confirm receipt or loss of one or more packets at the destination point.

The transmission device can detect and react to congestion within the network and allows for rate regulation of the aggregate flow without adding marking data to every existing packet.

According to one embodiment of the present invention, the forwarding point is analogous to a virtual sender, implemented by a router. Similarly, the destination point is analogous to a virtual receiver, also implemented by a router. The two routers are connected across a network of components by an aggregate trunk. The forwarding router includes a control unit responsible for implementing the flow control of the aggregate trunk. The control unit observes incoming packets to find for each packet a packet identifier. More specifically, the sender will look at the packet structure to find a bit sequence that is sufficiently unique to distinguish the packet from other packets in the stream. This packet identifier is recorded in a data structure. The control unit processes this data structure in conjunction with successive acknowledgement messages received from the virtual receiver, also containing the packet identifier (read or observed by the virtual receiver and included in the acknowledgement message), to determine if packets are being dropped. In the affirmative, the packet forwarding rate is decreased, otherwise it is increased.

According to yet another embodiment of the present invention, control packets are inserted into the aggregate trunk traffic stream at the forwarding point. The destination point is only responsible for acknowledging the control packets, and not the data packets of the aggregate traffic stream. Thus, flow control of the aggregate trunk can be implemented by looking only at the control packets. The control packets can be distinguished from the other packets based on some arbitrary identifier that is present in the control packets but absent in the other (non-control) packets. A possible variant is to insert packet sequence information in the control packets, such that the destination point can send a control message to the forwarding point only when a control packet is missing.

In yet another embodiment, some of the aggregate traffic stream packets are marked at the forwarding point, and the destination point only acknowledges these marked packets. A possible variant is to use the marking data to convey packet sequence information, such that the destination point can send a control message to the forwarding point only when a marked packet is missing.

The present invention also encompasses a method for controlling the flow of an aggregate traffic stream between a forwarding point and a destination point.

Other aspects and features of the present invention will become apparent to those ordinarily skilled in the art upon review of the following description of specific embodiments of the invention in conjunction with the accompanying figures.

DESCRIPTION OF A PREFERRED EMBODIMENT

Figure 1:
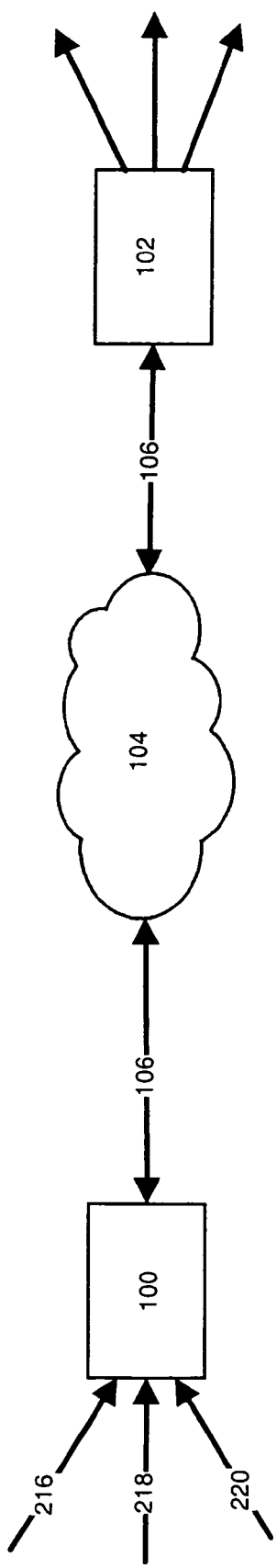
FIG. 1 is a block diagram of a flow controlled aggregate stream in an IP network, in accordance with an embodiment of the present invention.

A conventional IP network implements bandwidth sharing among host machines using the Transport Control Protocol (TCP). Although data flow in the network can be bi-directional, it is usual to refer to the originator of a particular piece of data as the sender and the other end as the receiver. In TCP, the sender (sender host machine) constantly tests the network to see if more bandwidth is available and uses the loss of a packet determined by sequence numbers of TCP packets as an indication to decrease its rate. Any lost packets are sent again so that there is a reliable flow of traffic. The loss of too many packets can cause the TCP connection to enter the timed out state.

Each packet contains a sequence number, which increases according to the number of bytes transmitted. The receiver acknowledges packets using this numbering scheme and always acknowledges the latest packet received in correct sequence. It may acknowledge each packet individually or wait in order to reduce overhead. It should definitely send an acknowledgement at least every second packet. Such acknowledgements can be piggybacked on data packets going in the reverse direction (from receiver to sender), or can be sent as stand-alone packets with no data. If a packet is received which is not in correct sequence, the receiver will immediately send an acknowledgement but the sequence number it acknowledges will be that of the last packet which was received in correct sequence. It should be noted that the sequence number in a packet corresponds to the last byte in the packet and the acknowledgement contains the next expected in-sequence byte number and thus acknowledges all bytes up to that number. In general terminology, a packet is acknowledged when the receiver reports that the next expected byte number is later than any bytes contained in that packet.

The general characteristic of TCP is that it is self-clocking. That is to say, the sender will wait for an acknowledgement from the receiver for the packets already sent before sending more packets. If the sender waited for each individual packet to be acknowledged than the maximum rate that the connection could achieve would be one packet per round trip time of the connection. To increase the sending rate while keeping the self-clocking nature of the protocol, the sender is allowed to send some number of packets while waiting for an earlier packet to be acknowledged. This number of packets is called the window. The receiver itself may constrain the size of the window in order to limit its buffer requirement.

The current size of the window is called the congestion window and can vary between one packet and the maximum that the receiver is prepared to accept. As the sender receives acknowledgements, the window slides forward and also increases in size. An increase in size allows the connection to run faster. If a packet is not acknowledged it will eventually be considered lost and this loss is assumed to be a result of congestion at some merge point. The sender, in addition to re-transmitting the packet, will reduce the window size. The slow and gradual increase in window size then begins again.

One embodiment of the present invention uses a mechanism to manage the data flow rate over a virtual connection between two points within a network that has some common points to the TCP process. This mechanism is referred to as TCP-like since the virtual sender receives an indication that forwarded packets have successfully passed through the virtual receiver, and the virtual sender uses the presence or absence of these acknowledgements to reduce and increase its rate. The term virtual refers to the fact that the connection corresponds to a control loop running between two points in the network (not necessarily host machines or encapsulation/decapsulation points). Further, the traffic flowing over the virtual connection between virtual sender and virtual receiver is not being generated at the virtual sender.

FIG. 1 illustrates an embodiment of a flow controlled aggregate connection (trunk), hereafter referred to as the virtual connection 106. The virtual connection 106 can be initiated between any two points in the network. Specific to this example, one of these points is referred to as the virtual sender, implemented as a router 100, while the other is referred to as the virtual receiver, implemented as router 102. Router 100 is the forwarding point and determines the packet sending rate (i.e. rate at which packets are forwarded onward). Router 102 is the destination point and monitors and acknowledges all packets received from the virtual sender 100. The functionality of these routers will be described in further detail below. The connection between virtual sender 100 and virtual receiver 102 may comprise a plurality of network 104 components, such as other routers.

Figure 2:
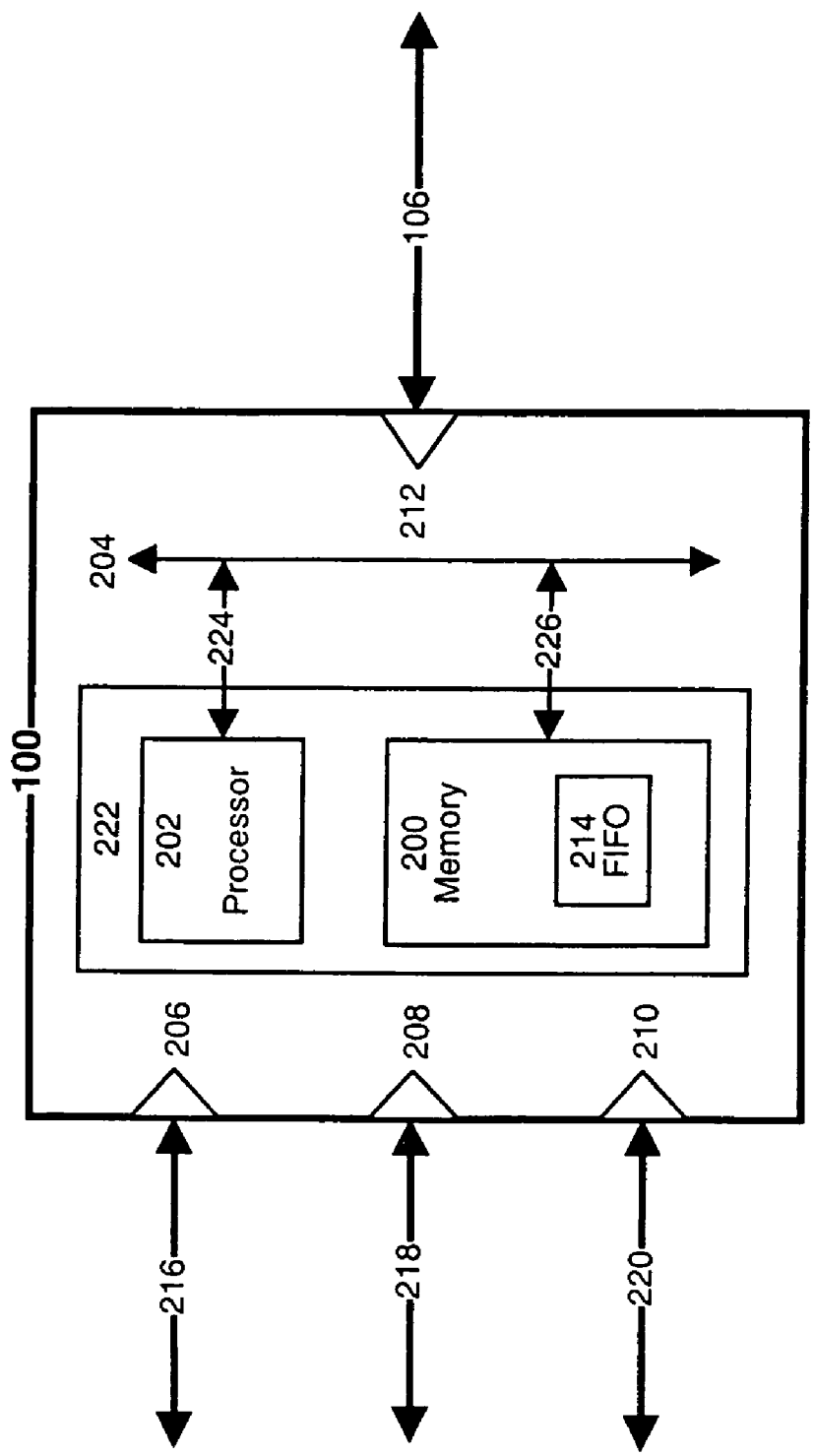
FIG. 2 is a block diagram of a router (virtual sender) shown in FIG. 1.

As shown in FIG. 2, router 100 (virtual sender) generally includes a control unit 222 and an internal bus 204. The control unit 200 itself includes a memory 200 and a processor 202, and is responsible for implementing the flow control of the aggregate trunk 106, as will be described in further detail below. The internal bus 204 interconnects the router 100 components, enabling data and control signals to be exchanged between them. Links 224 and 226 provide for the input and output of data to and from the components of the control unit 222, in cooperation with the internal bus 204. Input ports 206, 208 and 210 connect the router 100 to physical links 216, 218 and 220, respectively, for receiving network traffic over the different link flows, where these flows have all been assigned (as per customer choice) to the virtual trunk initiated between virtual sender 100 and virtual receiver 102. Virtual port 212 is an output port that connects the router 100 to the virtual connection 106 for forwarding aggregate traffic streams to the virtual receiver 102.

The memory 200 of the control unit 222 includes a First-In-First-Out (FIFO) buffer 214 that can hold data packets received at the various input ports. The purpose of the buffer is to provide a temporary storage mechanism for holding all traffic allocated to the virtual connection 106 (i.e. traffic from all three input ports 206, 208 and 210) until a decision is made by the control unit 222 to forward the packets onward over the virtual connection 106. The physical configuration of the buffer 214 does not need to be described in detail because such components are readily available in the marketplace and the selection of the appropriate buffer mechanism suitable for use in the present invention is well within the reach of a person skilled in the art. The memory 200 also supports a standard TCP congestion window and a storage data structure, the latter including a packet identity table and a packet scoreboard table, for use by the virtual sender 100 control unit 222, all three of which will be described in further detail below.

The memory 200 further contains a program element that regulates the flow control operation of the router 100. That program element is comprised of individual instructions that are executed by the processor 202, for implementing the flow control of the aggregate connection 106 between virtual sender 100 and virtual receiver 102. This program element will be described in further detail below.

In this embodiment the virtual sender 100 adds no information to the data packets that it receives and forwards on to the virtual receiver 102. The sender 100 and the receiver 102 achieve packet identification by inspecting a part or all of the packet's existing contents. This part is called "packet identifier". This means that to perform packet identification, say at the sender 100, the sender 100 will look at the packet structure to find a bit sequence that is sufficiently unique such as to allow to distinguish this packet from other packets in the flow. Once a packet is received by the virtual receiver 102, the receiver 102 reads some or all of the contents of the packet in order to determine its unique identity (packet identifier) in the same manner as the sender 100. The sender 100 and the receiver 102 are set to look at the same part of the packet when they perform packet identification, so that they extract the same bit sequence. The particular packet part or section looked at by the virtual sender 100 and the receiver 102 can be arbitrarily set. It should also be noted that the entire packet may serve as the packet identifier, as the packet identifier is not necessarily limited to a portion of the packet.

The receiver 102 then sends an Acknowledgement Message containing this packet identifier to the sender 100 in order to confirm receipt of the particular packet. Assume for this example that the packets being forwarded from the virtual sender 100 to the virtual receiver 102 originated at a TCP/IP encapsulation point. Each packet will contain a unique sequence number for the encapsulated TCP connection and an identifier for the trunk (for instance the source and destination IP addresses), forming for each packet the requisite packet identifier. Thus, in this case, the sender 100 and the receiver 102 are programmed to look at the sequence number field to generate a packet identifier.

In another example, the packets may be coming from a TCP sender in a host, where typically there is already a well understood way of using IP addresses, TCP port numbers and a sequence number to get a unique packet identifier. In yet another example, the packets may be unencapsulated Unacknowledged Datagram Protocol (UDP) packets, MPLS packets or encrypted packets, for which a hash coded form of the packet contents can be used to form the unique packet identifier. In such a case, it is necessary to take a large enough number of bytes from the packet in order to ensure that the hash code generated has a high probability of being unique. Further, the bytes selected from the packet must not include fields that might change between virtual sender 100 and virtual receiver 102, such as a Time-To-Live (TTL) indication. Note that over an MPLS path the packet is not changed, so there is more freedom in choosing the bytes to use.

Most preferably, the virtual receiver 102 acknowledges every packet received from the virtual sender 100. Note that the virtual receiver 102 can compose Acknowledgement Messages containing one or more packet receipt acknowledgements and insert them into the flow of traffic traveling towards the virtual sender 100.

The router 102 (virtual receiver) is structurally very similar to the virtual sender 100, and as such will not be described from a structural point of view. Although for this example the virtual receiver 102 as shown in FIG. 1 is the destination point for only one trunk, notably virtual connection 106, in a typical telecommunications network such a router may act as the terminating point for a plurality of such trunks, where each trunk forms a particular virtual connection between the virtual receiver 102 and a different virtual sender. Since the virtual receiver 102 has no knowledge of which packets come from which sender, it acknowledges receipt of a packet to the virtual sender for each of the trunks it is terminating. An Acknowledgement Message is broadcast by the virtual receiver 102 to all of the virtual senders to which it is connected. Note that in the case of an MPLS packet stream, the labels give a direct indication of which sender to respond to, avoiding the requirement for an acknowledgement broadcast. For the sake of the present example, assume hereinafter that the virtual receiver 102 is connected to only one sender, notably virtual sender 100.

Since there is no sequence number information added to the packets passing through virtual sender 100 with respect to the virtual connection 106, later Acknowledgement Messages sent by the virtual receiver 102 can not imply receipt of earlier packets, as is currently implemented by the standard TCP acknowledgement protocol. The loss of such an Acknowledgement Message may have an undesirable effect by suggesting the loss of many packets. In the context of the present invention, it is preferred that the virtual receiver 102 repeats an Acknowledgement Message until virtual sender 100 acknowledges receipt of it. Under this implementation, the virtual sender 100 acknowledges every Acknowledgement Message received from the virtual receiver 102 with a Return Acknowledgement Message.

When the virtual sender 100 transmits a packet over the virtual connection 106, it first determines the packet's unique identifier and its length, with which it calculates an equivalent byte sequence number. It then stores this sequence number by mapping it to the particular packet identifier in the aforementioned packet identity table of memory 200. When the virtual sender 100 receives Acknowledgement Messages from the virtual receiver 102, it reconstructs sequence number information by extracting the packet identifier from the Acknowledgement Message and reading the corresponding sequence number from the packet identity table.

Figure 3:
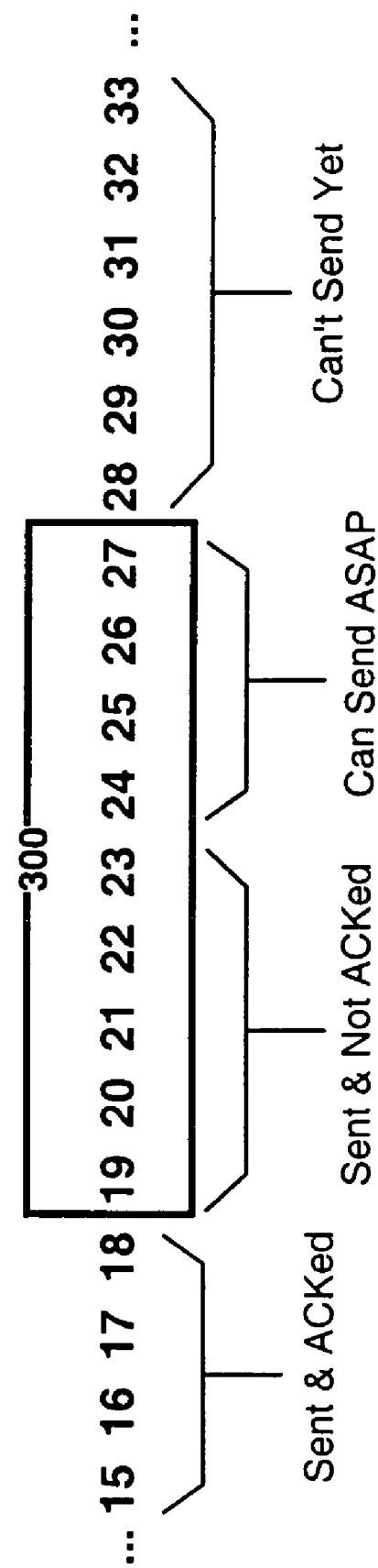
FIG. 3 illustrates a TCP congestion window function used in an embodiment of the present invention.

Byte sequence numbers manage the congestion window stored in memory 200 of the virtual sender 100, as per standard TCP protocol. A typical example of such a congestion window is that shown in FIG. 3, where the left-hand side of the congestion window 300 is aligned with the earliest packet that has been sent but not acknowledged. Since the congestion window 300 is a feature of TCP protocol that is well known in the art and has been well documented, it will not be described in further detail. The control unit 222 of the virtual sender 100 keeps a history of identities of packets passed forward but not yet acknowledged and processes this history in conjunction with arriving Acknowledgement Messages to adjust the pointers to the congestion window 300 and thus regulate the rate at which packets are forwarded over the virtual connection 106. In a particular example, this history is stored in a packet scoreboard in memory 200 of the virtual sender 100. The packet scoreboard is an array of binary variables, indexed by the packet byte sequence numbers. When a packet is sent over the virtual connection 106, the variable indexed by the packet identifier's corresponding sequence number is set to 1.

When a packet is acknowledged, the variable indexed by the packet identifier's corresponding sequence number is cleared to 0 and, if it is the earliest packet, the left side of the congestion window 300 is moved to align with the earliest packet sent but not yet acknowledged. Thus, the packet scoreboard is a rolling list of packets that corresponds to the current congestion window 300, allowing the virtual sender 100 to detect the equivalent of multiple duplicate acknowledgements and decide whether a packet has been lost. Normal TCP mechanisms are used by the virtual sender 100 to implement window increase and decrease for controlling the sending rate of packets being transmitted over the virtual connection 106. Specifically, the virtual sender 100 will progressively increase the congestion window 300 size, and thus the sending rate, until one or more packets are lost in the network between itself and the virtual receiver 102. The virtual sender 100 detects packet loss in dependence upon the Acknowledgment Messages, or lack thereof, received from the virtual receiver 102. On detecting packet loss (i.e. a packet forwarded over the virtual connection 106 to the virtual receiver 102 is never acknowledged), the virtual sender 100 reduces its congestion window 300 in order to decrease the sending rate. A lower sending rate on the aggregate trunk will be reflected as packet discard at the FIFO buffer 214, which in turn will eventually be seen by the real sender.

Note that once a packet loss has been acted on by the virtual sender 100, the packet is marked as delivered. The virtual receiver 102 does not wait for resends of packets that have been lost, but rather simply passes on all packets as fast as possible to avoid adding to network latency. If required, the real sender, that is the originator of the packet (i.e. TCP sender in a host, TCP/IP encapsulation point, etc), will achieve packet reliability. Consequently, the virtual sender 100 does not retransmit lost packets or store them once they are sent over the virtual connection 106.

Figure 4:
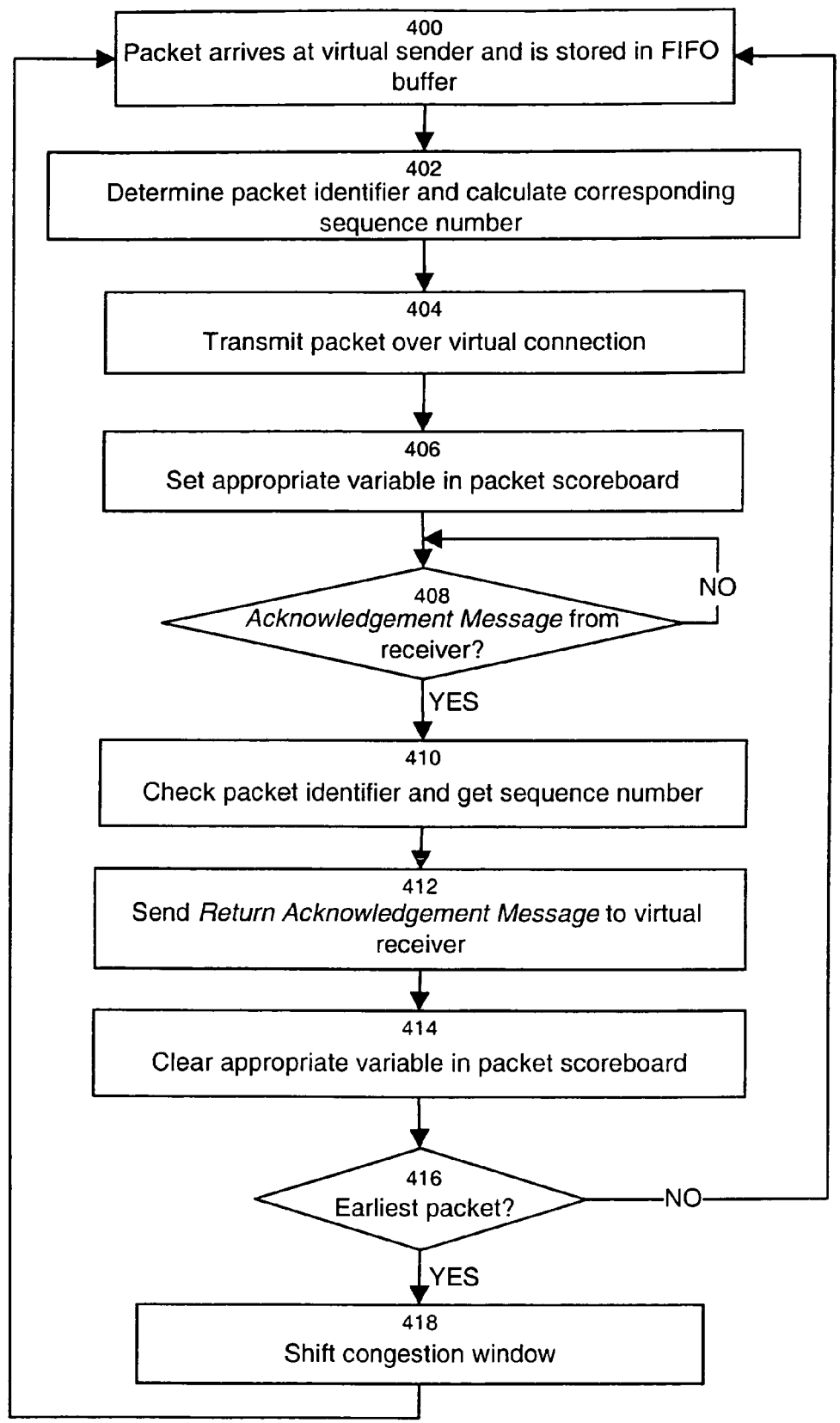
FIG. 4 is a flowchart illustrating the operation of a program element in the router depicted in FIGS. 1 and 2, which implements the flow control of the aggregate stream.

FIG. 4 provides a complete flowchart illustrating an example of the operation of the program element stored in the memory 200, and executed by the processor 202, that regulates the operation of the virtual sender 100, in particular the flow control of the aggregate trunk 106. At step 400, a packet from a traffic flow assigned to the aggregate trunk 106 arrives at input port 206 of the virtual sender 100, and is stored in FIFO buffer 214. At step 402, a unique packet identifier is determined and a corresponding byte sequence number calculated for the packet. The two values are stored and mapped to each other in the packet identity table in memory 200 of the virtual sender 100. The packet is next sent over the aggregate trunk 106 to the virtual receiver 102, at step 404. Immediately following transmission, at step 406, the packet scoreboard in memory 200 of the virtual sender 100 is accessed and the variable indexed by the packet's sequence number is set to 1, indicating that the packet has been sent but has not yet been acknowledged. The program next waits for a packet Acknowledgement Message from the virtual receiver 102 at step 408. When such a message is received, the packet identifier is read from the message and the corresponding byte sequence number obtained from the packet identity table, at step 410. Assume for this example, that the message received acknowledges receipt of the particular packet sent out earlier at step 404. At step 412, the virtual sender 100 sends a Return Acknowledgement Message back to the virtual receiver 102 confirming receipt of the particular packet Acknowledgement Message, where this Return Acknowledgement Message includes the particular packet identifier. Next, the appropriate variable in the packet scoreboard is cleared, indicating that the packet has been sent and acknowledged, at step 414. At step 416, the program checks to determine whether the acknowledged packet corresponds to the earliest packet in the congestion window 300. If so, the window is shifted at step 418 to align with the earliest packet that has been sent but not acknowledged.

In an alternative embodiment of the present invention, simple marking of the packets is implemented by a marking unit at the virtual sender, allowing for certain packets to be selectively marked for acknowledgement by the virtual receiver. Thus flow control is implemented by looking only at the marked packets, which is somewhat analogous to sampling the network between virtual sender and receiver in order to provide the virtual sender with a view of the existing congestion conditions. Such an implementation reduces the processing power required as well as the amount of acknowledgement traffic because fewer packets need to be processed. Objectively, more bandwidth is consumed since marking data must be inserted in some of the packets. The marking data is a unique combination of bits placed by the marking unit at a known location in the packet. Such a location can be in an existing field of the packet or a new field can be created and appended to the packet. The receiver 102 is set to look for this unique combination of bits at the predetermined location and examines each packet for this feature. Only packets containing this feature are being acknowledged.

In a possible variant, the marking data in addition to being an identifier may also include a sequence number. Thus the marking data may be structured as a two-element data block, the first element indicating that this is a marked packet and the second element indicating the sequence number of the packet that is different from one packet to the other. The sequence number is useful because it allows the virtual receiver to determine which packets have been dropped only by observing the sequence continuity in the received marked packets. Thus the virtual receiver may issue a control message to indicate the loss of one or more marked packets, rather than issuing acknowledgement messages to confirm the receipt of each marked packet. This is preferred since confirming loss of marked packets will require fewer messages from the virtual receiver to the virtual sender than confirming receipt of all marked packets.

In yet another alternative embodiment, the virtual sender includes a packet generator unit for generating control packets. These control packets are inserted into the aggregate trunk traffic stream and flow control implemented by looking only at the control packets, thus eliminating the requirement for robust identification of packets. Although a control packet could be sent for each user packet, it would be more efficient for control packets to be sent only as often as required to maintain a responsive control loop. The control packets are sampling the network between virtual sender and virtual receiver in order to give the sender a view of the existing congestion conditions. In such an implementation of a virtual TCP connection, the virtual sender maintains accounting on the whole traffic flow in order to perform window management. Although additional bandwidth is required to transport the control packets, this embodiment uses less bandwidth than prior art approaches where encapsulation requires that every data packet contain control information.

In a possible variant, the control packets may include sequence number information, removing the need for identification of user packets. Further, the virtual receiver may send a control message to notify the virtual sender of one or more missing packets, as opposed to sending acknowledgement messages upon receipt of every control packet. Such an alternative reduces the processing power required at a router (no packet identification required) and reduces acknowledgement traffic at the cost of some bandwidth.

The above description of a preferred embodiment under the present invention should not be read in a limitative manner as refinements and variations are possible without departing from the spirit of the invention. The scope of the invention is defined in the appended claims and their equivalents.

We claim:

1. A transmission device for forwarding aggregate traffic streams towards a destination point, an aggregate traffic stream being comprised of a plurality of packets, said transmission device comprising:
   an input for receiving the aggregate traffic streams;
   an output for forwarding the aggregate traffic streams to the destination point;
   a control unit operative to:
   a) generate for each packet of each aggregate traffic stream passing from said input to said output a unique packet identifier for distinguishing the respective packet from all of the other packets, by extracting at least a portion of the contents of the respective packet to serve as said packet identifier, wherein said at least a portion of the contents of the respective packet is not specifically designated for packet identification purposes within the respective packet;
   b) maintain a record of the generated packet identifiers;
   c) forward the aggregate traffic streams to the destination point without adding any data elements to the packets of the aggregate traffic streams.

2. A transmission device as defined in claim 1, wherein said control unit has an input for receiving acknowledgement messages issued from the destination point to notify said transmission device that a certain packet released from said output has been received at the destination point, each acknowledgement message conveying information relative to a particular one of said packet identifiers, said control unit being further operative to process successive acknowledgement messages received from the destination point in conjunction with said record of packet identifiers for regulating a rate at which packets are released from said output.

3. A transmission device as defined in claim 2, wherein said control unit includes a data structure, said control unit being operative to record said generated packet identifiers in said data structure.

4. A transmission device as defined in claim 3, wherein said control unit is operative to process said data structure in conjunction with successive acknowledgement messages received from the destination point to regulate the rate at which packets are released from said output.

5. A transmission device as defined in claim 4, wherein said control unit is operative to process said data structure in conjunction with successive acknowledgement messages received from the destination point in order to determine whether packets forwarded to the destination point have not been received at the destination point.

6. A transmission device as defined in claim 5, wherein if at least one packet has not been received at the destination point, said control unit is operative to reduce a rate of release of the packets from said output.

7. A transmission device as defined in claim 6, wherein said control unit is operative to progressively increase a rate of release of the packets from said output until a packet is not received at the destination point.

8. A transmission device as defined in claim 1, wherein said at least a portion of the contents of the respective packet is a bit sequence.

9. A transmission device as defined in claim 3, wherein said control unit calculates a corresponding sequence number for each generated packet identifier, said control unit operative to map each sequence number to the respective packet identifier in said data structure.

10. A transmission device as defined in claim 8, wherein said sequence number is a byte sequence number.

11. A method for forwarding aggregate traffic streams from a transmission device towards a destination point, an aggregate traffic stream being comprised of a plurality of packets, said transmission device comprising:
    an input for receiving the aggregate traffic streams;
    an output for forwarding the aggregate traffic streams to the destination point;
    said method comprising:
    a) generating for each packet of each aggregate traffic stream passing from said input to said output a unique packet identifier for distinguishing the respective packet from all of the other packets, by extracting at least a portion of the contents of the respective packet to serve as said packet identifier, wherein said at least a portion of the contents of the respective packet is not specifically designated for packet identification purposes within the respective packet;
    b) maintaining a record of the generated packet identifiers;
    c) forwarding the aggregate traffic streams to the destination point without adding any data elements to the packets of the aggregate traffic streams.

12. A method as defined in claim 11, wherein said method comprises receiving acknowledgement messages issued from the destination point to notify said transmission device that a certain packet released from said output has been received at the destination point, each acknowledgement message conveying information relative to a particular one of said packet identifiers, said method further comprises processing successive acknowledgement messages received from the destination point in conjunction with said record of packet identifiers for regulating a rate at which packets are released from said output.

13. A method as defined in claim 12, comprising recording said generated packet identifiers in a data structure.

14. A method as defined in claim 13, comprising processing in conjunction with successive received from the destination point said data structure acknowledgement messages to regulate the rate at which packets are released from said output.

15. A method as defined in claim 14, comprising processing said data structure in conjunction with successive acknowledgement messages received from the destination point in order to determine whether packets forwarded to the destination point have not been received at the destination point.

16. A method as defined in claim 15, wherein if at least one packet has not been received at the destination point, said method comprises reducing a rate of release of the packets from said output.

17. A method as defined in claim 16, wherein said method comprises the step of progressively increasing a rate of release of the packets from said output until a packet is not received at the destination point.

18. A method as defined in claim 13, wherein said method comprises calculating a corresponding sequence number for each generated packet identifier, said method further comprises mapping each sequence number to the respective packet identifier in said data structure.

19. A transmission device for forwarding aggregate traffic streams towards a destination point, an aggregate traffic stream being comprised of a plurality of packets, said transmission device comprising:

input means for receiving the aggregate traffic streams in the transmission device;
output means for releasing the aggregate traffic streams from the transmission device toward the destination point;
control means operative to regulate a rate at operative to:
a) generate for each packet of each aggregate traffic stream passing from said input means to said output means a unique packet identifier for distinguishing the respective packet from all of the other packets, by extracting at least a portion of the contents of the respective packet to serve as said packet identifier, wherein said at least a portion of the contents of the respective packet is not specifically designated for packet identification purposes within the respective packet;
b) maintain a record of the generated packet identifiers;
c) forward the aggregate traffic streams to the destination point without adding any data elements to the packets of the aggregate traffic streams.

20. A data transmission system comprising:
a plurality of transmission nodes;
each of said plurality of transmission nodes comprising:
a) an input for receiving aggregate traffic streams, each aggregate traffic stream being comprised of a plurality of packets;
b) an output for forwarding the aggregate traffic streams to a destination point;
c) a control unit operative to:
 i) generate for each packet of each aggregate traffic stream passing from said input to said output a unique packet identifier for distinguishing the respective packet from all of the other packets, by extracting at least a portion of the contents of the respective packet to serve as said packet identifier, wherein said at least a portion of the contents of the respective packet is not specifically designated for packet identification purposes within the respective packet;
 ii) maintain a record of the generated packet identifiers;
 iii) forward the aggregate traffic streams to the destination point without adding any data elements to the packets of the aggregate traffic streams.

* * * * *